Jan. 24, 1928.
H. SCHNEIDER
1,657,412
STEERING ARRANGEMENT FOR HEAVY MOTOR VEHICLES
Filed April 26, 1926
3 Sheets-Sheet 1
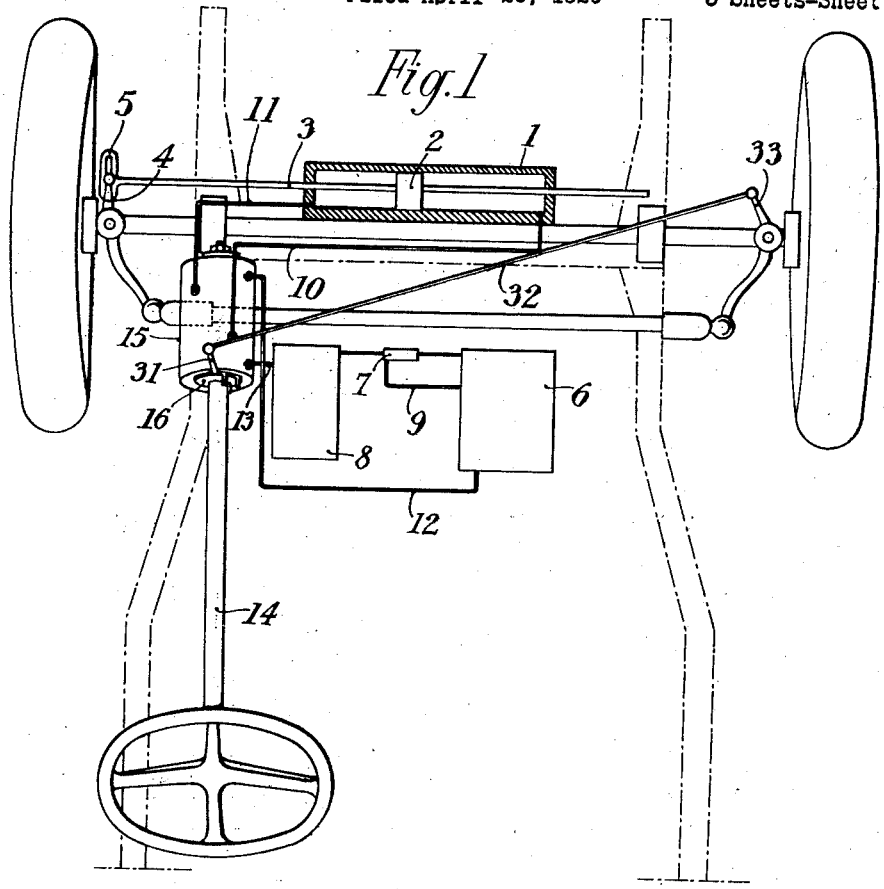
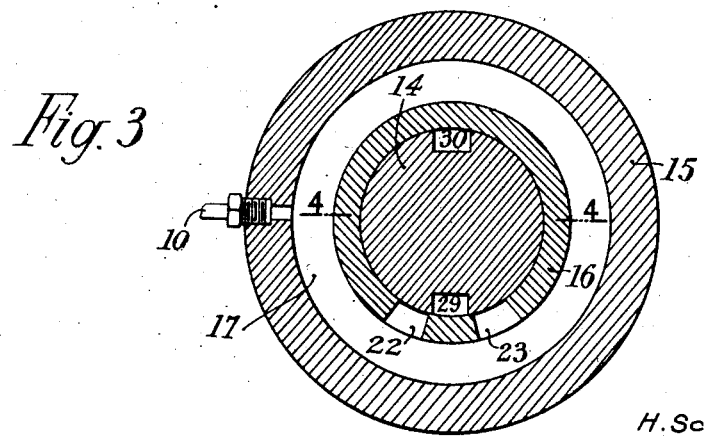
H. Schneider
INVENTOR
By: Marks & Clerk
Attys Jan. 24, 1928.

H. SCHNEIDER 1,657,412

STEERING ARRANGEMENT FOR HEAVY MOTOR VEHICLES

Filed April 26, 1926    3 Sheets-Sheet 2

H. Schneider
INVENTOR

By: Marks & Clerk
Attys

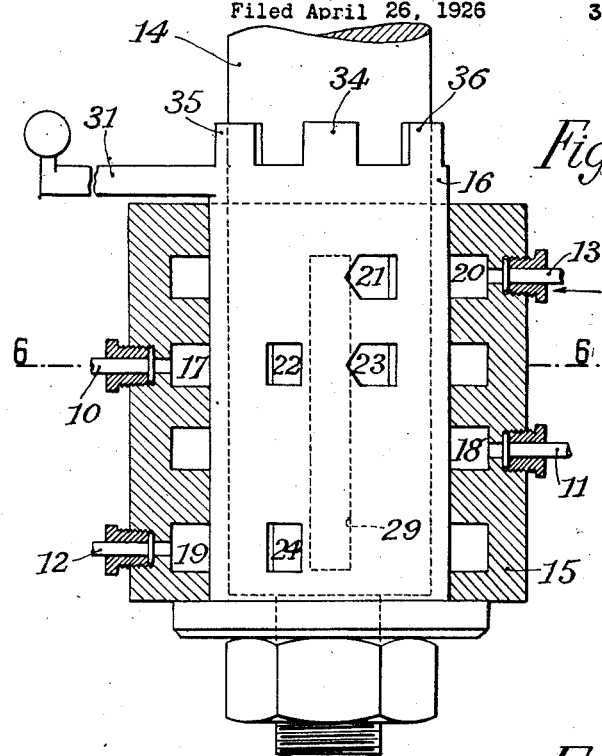
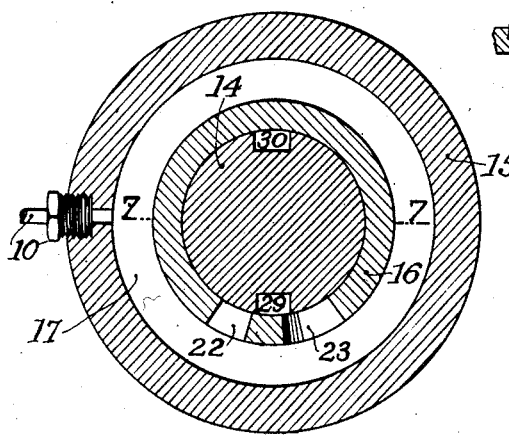
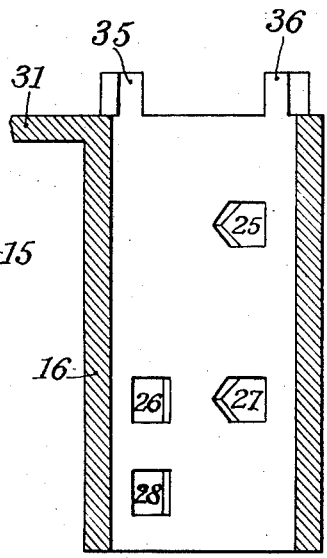

Patented Jan. 24, 1928.

1,657,412

UNITED STATES PATENT OFFICE.

HANS SCHNEIDER, OF PARIS, FRANCE.

STEERING ARRANGEMENT FOR HEAVY MOTOR VEHICLES.

Application filed April 26, 1926, Serial No. 104,738, and in France July 29, 1925.

The present invention relates to a steering arrangement for heavy motor vehicles whereby the steering will be facilitated and the reactions of the vehicle wheels upon the steering wheel will be obviated.

My said arrangement comprises a piston actuated by a fluid under pressure which controls the steering of the wheels, and valve gear for the said fluid which is actuated firstly by the rotation of the steering column and secondly by the pivoting of the wheels.

The appended drawings show by way of example various embodiments of the invention.

Fig. 1 is an axial section of the device.

Fig. 3 is a section on the line 3—3 of Fig. 2, and

Figure 4:
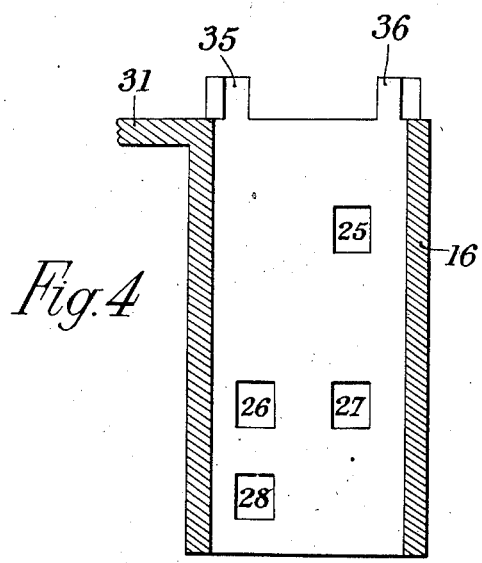

Fig. 4 a section on the line 4—4 of Fig. 3.

Figs. 5, 6 and 7 relate to a modification.

Fig. 5 is an axial section of the valve gear.

Fig. 6 is a cross section on the line 6—6 of Fig. 5.

Fig. 7 is an axial section of the valve sleeve on the line 7—7 of Fig. 6.

Fig. 1 is a general view of the device wherein the cylinder 1 for pivoting the wheels is provided with a piston 2 whose rod 3 is connected with an arm 4 mounted on one of the wheel spindles, this connection being made by means of a guide 5 which provides for the straight motion of the piston. A fluid tank 6 supplies—through the pump 7—a recipient 8 in which the fluid is subjected to pressure. A suitable device, not shown, automatically places the pump in short-circuit upon the tank 6 through the conduit 9, when the pressure in the recipient 8 attains a certain value. A valve device for the liquid is connected at one end with the two faces of the piston 2 by the conduits 10 and 11, and at the other end respectively with the tanks 6 and 8 by the pipes 12 and 13.

The said valve device is mounted on the steering column 14 and comprises a stationary sleeve 15 within which is rotatable a socket 16 which is fitted upon the said column 14. In the said sleeve are provided four channels, 17, 18, 19, 20, into which open the respective conduits 10, 11, 12, 13. The socket is provided on two of its faces with ports corresponding to the channels, the ports 21, 22, 23, 24 being formed upon one face and the ports 25, 26, 27, 28 on the other face.

In the column or rod 14 are formed two longitudinal grooves 29 and 30 corresponding respectively to the two sets of ports. The socket 16 is secured to the arm 31 which is connected by a rod 32 with an arm 33 secured to one of the wheel's spindles. The motion of the rod 14 in the socket 16 is limited by a boss 34 on the rod 14 and by two abutments 35—36 secured to the socket 16, so that the maximum stroke to the right and left will correspnod to the coincidence of the said ports with the grooves 29 and 30.

The operation is as follows:

If the steering wheel is turned to the left, the socket 16 being held by the rod 32, the slot 29 will coincide with one of the ports 21—23 and the slot 30 with one of the ports 26—28.

The fluid under pressure in the recipient 8 passes through the conduit 13, the channel 20, the port 21, the slot 29, the port 23, the channel 17, and the conduit 10 into the right hand part of the cylinder 1. At the same time, the fluid in the left hand part of said cylinder passes through the conduit 11, the channel 18, the port 26, the slot 30, the port 28, and the channel 19, and returns to the tank 6 through the conduit 12.

Figure 2:
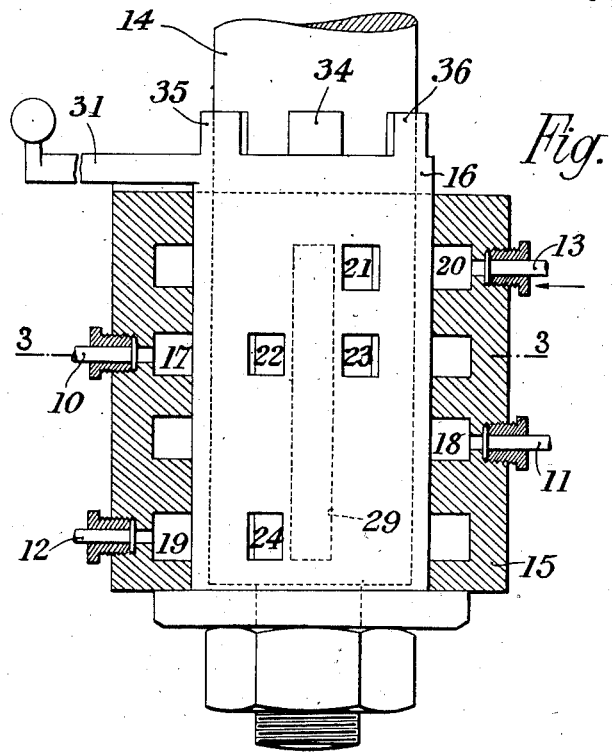
Fig. 2 is an axial section of the valve gear.

The piston 2 will thus be moved to the left, so that the vehicle wheels will be pivoted to the left. But at the same time, this motion will be transmitted through the rod 32 to the arm 31, and the socket 16 will turn to the left, thus resuming with reference to the rod 14 its position shown in Fig. 2; the slots 29, 30 will no longer coincide with the ports, so that the fluid cannot circulate and the movement will be stopped.

But if the steering column is turned to the right, the slots 29, 30 will coincide with the ports 22, 24, 25, 27; the fluid under pressure is admitted through 11 and is discharged through 10; the wheels are thus turned to the right, and the socket 16 is turned to the right whereby the motion will be stopped.

In practice, the valve device is normally closed, and it is only opened to the full extent in exceptional cases; small openings will suffice for the slight displacements required during the travel. The closing of the valve device should be quite accurate in order that the parts will operate without useless play and loss of time and that each operation of the steering wheel will correspond to a pivoting of the vehicle wheels. When the wheels have been properly turned, they will be held in place by the pressure of the liquid on both faces of the piston.

It should be noted that a slight movement of the steering wheel, or about 1/3 of a revolution, will suffice to turn the vehicle wheels entirely to the right or left, and this will afford a great facility for the steering, which is analogous to that of a bicycle. Should the pressure of the liquid in the tank 8 fail for any reason, the wheels can still be pivoted by the steering wheel through the levers 31 and 33.

My said apparatus may be of the pneumatic, hydraulic or hydro-pneumatic type.

The pneumatic apparatus has a more rapid operation, but it will be rapidly put out of order and damaged from the fact that all air compressors must operate at a high speed. But in a hydraulic or hydro-pneumatic apparatus, the pump can operate at slow speed and all of its parts will be automatically lubricated if the liquid consists of oil or the like.

The modification shown in Figs. 5 to 7 is specially adapted for use with compressed gas; herein the device shown in Figs. 1-4 would make the steering operation unsteady; for instance a shock upon a wheel would move the piston to the side at which the gas had just been discharged, and the remaining gas could not offer a sufficient resistance. This will not occur with the use of a liquid, since it is practically non-compressible.

The inlet ports 21, 23, 25, 27 in the socket 16 are modified so as to provide, in the closing position, for the admission of compressed air into the cylinder on both sides of the piston. The said ports may as shown in the drawings be prolonged by the recesses 37 extending as far as the slots 29; said recesses end preferably in a point so as to assure the progressive reduction of the flow section for the compressed air. The exhaust remains tightly closed, as in the preceding case. In this manner, in the closing position of the valve device, the flow section is only sufficient to maintain the air contained in the cylinder on both sides of the piston at the pressure prevailing in the compressed air tank; any improper displacement of the piston will meet with such a great resistance that it will be at once stopped and made practically negligible.

The operation is the same as for the preceding device, and when the steering wheel is turned, this will open the inlet on one side and the exhaust on the other side. In the closing position, the exhaust is closed and the two inlets are slightly opened. During the operation, one inlet is opened and also one outlet. Obviously, without departing from the invention I may obtain the same result by changing the disposition of the ports instead of changing their shape.

Instead of employing two longitudinal slots 20 in the steering column or rod and two sets of corresponding ports in the socket, it may be advantageous to provide four or six very narrow longitudinal slots and four or six sets of ports, so that a slight movement of the steering wheel will open the valve device to the maximum in either direction and will effect the corresponding pivoting of the wheels in an exact and instantaneous manner.

I prefer to employ a device whereby the compressor which is constantly actuated by the motor, will operate without load as soon as the air pressure in tank attains a certain value. For instance a piston actuated by compressed air against a spring may serve to cut off the intake of air to the compressor when the pressure in the tank is sufficient.

To provide for the silent exhaust of the air, it will be discharged into the muffler of the vehicle or into a like device.

The compressed air may be employed to inflate the pneumatic tires.

The compressor may be of the usual type or of the rotary type.

I may provide suitable means for cutting off the aforesaid valve gear when the vehicle is stopped, for instance a spring or a ratchet device which will readily yield and thus allow the steering wheel to be rotated.

Obviously, I may arrange the several parts in various manner differing from what is herein represented, and the cylinder 1 might be secured to any suitable part of the vehicle frame and placed in the lengthwise direction; the guide 5 may be eliminated and the cylinder 1 will then be pivoted.

Having thus described my apparatus, what I claim as new therein, and my own invention, is:—

1. In a motor vehicle comprising a steering device consisting of a steering wheel and column, a cylinder mounted on the vehicle frame, a piston coacting with the said cylinder, means for connecting the said piston with one of the spindles of the vehicle wheels, a tank containing fluid under pressure, a recipient containing fluid, a compressor disposed between the said recipient and the said tank, the steering column or rod having formed therein two longitudinal slots in diametrical position, a socket revoluble upon the said rod and provided with ports coacting with the said slots, link gear connecting the said socket with one of the wheel spindles, a stationary sleeve surrounding the said socket and provided with four internal channels which are situated at the same level as the respective ports, a conduit connecting one of the said channels with the fluid tank, a second conduit connecting another of the said channels with the fluid recipient, and two other conduits respectively connecting the other two channels with the two ends of the cylinder.

2. In a motor vehicle comprising a steering device consisting of a steering wheel and column, a cylinder mounted on the vehicle frame, a piston coacting with the said cylinder and connected with one of the spindles of the vehicle wheels, a tank containing fluid under pressure, a recipient containing fluid, a compressor disposed between the said recipient and the said tank, the steering column or rod having formed therein, two longitudinal slots in diametrical position, a socket revoluble upon the said rod and provided with ports coacting with the said slots, link gear connecting the said socket with one of the wheel spindles, a stationary sleeve surrounding the said socket and provided with four internal channels which are situated at the same level as the respective ports, a conduit connecting one of the said channels with the fluid tank, a second conduit connecting another of the said channels with the fluid recipient, and two other conduits respectively connecting the other two channels with the two ends of the cylinder, a boss mounted on the steering rod, abutments mounted on the said socket and coacting with the said boss, said abutments limiting the rotation of the said socket relatively to the steering rod in either direction.

3. In a motor vehicle, the combination of a rotary steering rod with means for controlling the steering of the wheels, these means being independent from the said steering rod, a cylinder secured to the vehicle frame, a piston sliding in this cylinder and positively connected with the said wheel steering means, a tank containing fluid under pressure, a valve device controlling the admission of this fluid into the cylinder and the exhaust therefrom, this valve device comprising a fixed part, a movable part positively connected with the said rotary rod and a second movable part positively connected with the said means for controlling the steering of the wheels, these two movable parts cooperating together for opening and closing the distribution ports according as to whether the position of the said means for controlling the steering of the wheels and that of the said steering rod respectively correspond or not.

In testimony whereof I have hereunto affix my signature.

HANS SCHNEIDER.